United States Patent [19]

Vangen

[11] Patent Number: 4,817,512
[45] Date of Patent: Apr. 4, 1989

[54] COOKING UTENSIL

[76] Inventor: Sandra K. Vangen, R.R. 1, Box 116, Ellendale, Minn. 56026

[21] Appl. No.: 931,052

[22] Filed: Nov. 17, 1986

[51] Int. Cl.⁴ .................. A47J 27/12; A47J 27/122
[52] U.S. Cl. ........................................ 99/367; 99/403; 99/416; 99/448; 219/417
[58] Field of Search .............. 99/367, 368, 359, 370, 99/416, 403, 448; 220/22; 219/417, 438

[56] References Cited

U.S. PATENT DOCUMENTS

| | | | |
|---|---|---|---|
| 516,938 | 3/1894 | Meyer | 99/367 |
| 2,223,432 | 12/1940 | Smith | 99/448 X |
| 2,664,495 | 0/0000 | Wehrli | 219/417 X |
| 2,976,391 | 3/1961 | Carlson | 219/417 X |
| 3,345,497 | 10/1967 | Porteous | 219/417 |
| 4,574,183 | 3/1986 | Knauss | 219/438 |

FOREIGN PATENT DOCUMENTS

| | | | |
|---|---|---|---|
| 88071 | 8/1896 | Fed. Rep. of Germany | 99/448 |
| 7106 | of 1896 | United Kingdom | 99/416 |
| 12543 | of 1914 | United Kingdom | 99/416 |
| 826086 | 12/1959 | United Kingdom | 99/403 |

Primary Examiner—James K. Chi
Attorney, Agent, or Firm—Leon Gilden

[57] ABSTRACT

A deep fryer includes two or more sections having separate on and off switches to permit the heating of each section individually. The fluid tight construction of each section prevents the intermixing of the cooking oil so that different types of food can be concurrently cooked in each section without the intermixing of flavors.

1 Claim, 2 Drawing Sheets

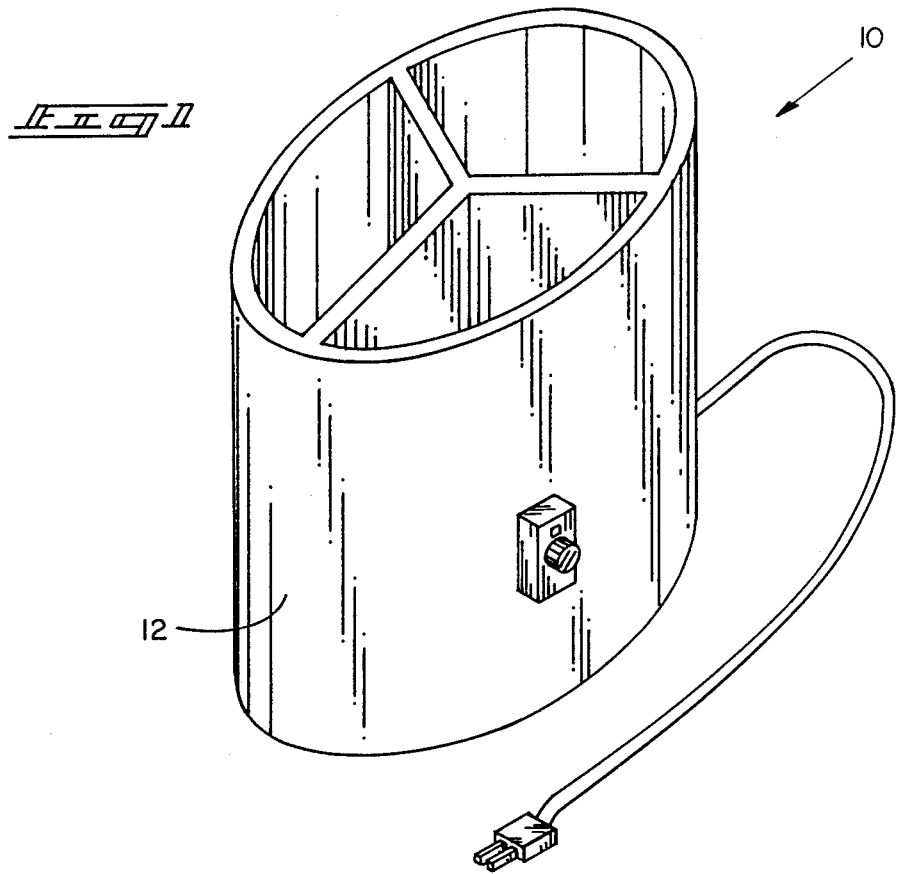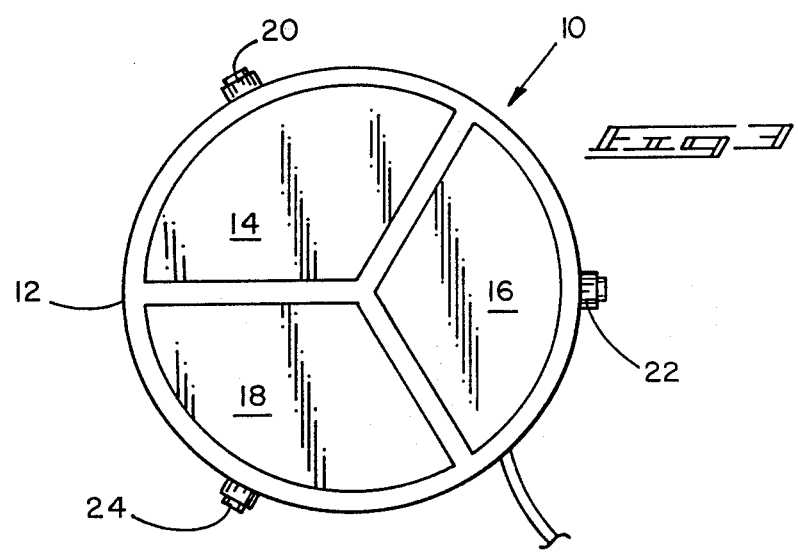

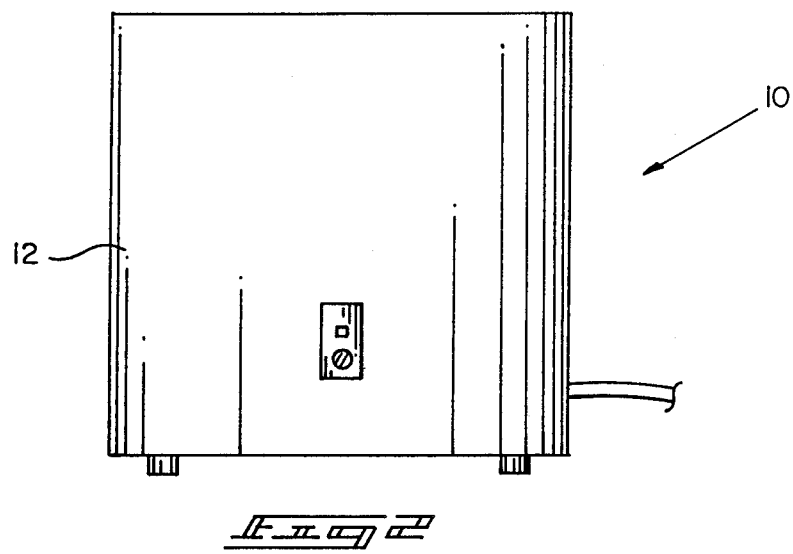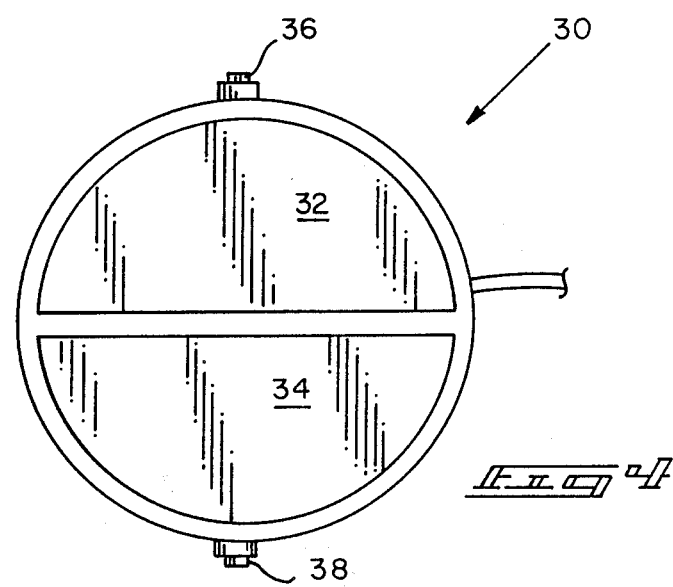

COOKING UTENSIL

BACKGROUND OF THE INVENTION

1. Field of the Invention

The present invention relates to cooking utensils, and more particularly pertains to a new and improved deep fryer which utilizes a plurality of individual fluid tight compartments, thereby to permit the cooking of different food within the deep fryer at the same time.

2. Description of the Prior Art

The use of cooking utensils having multiple compartments to permit the concurrent cooking of different foods is well known in the prior art. For example, U.S. Pat. No. 869,690, which issued to J. Brown on Oct. 29, 1907, discloses a deep fat fryer which has a plurality of separate baskets immersible therein to effect the concurrent frying of several different types of food. However, all of the baskets are perforated so as to allow the same cooking oil to flow therethrough, whereby the flavors of the different foods become substantially intermixed. This construction is prevalent in a large number of prior art patents. Another good example is to be found in U.S. Pat. No. 1,316,827, which issued to A. Brunner on Sept. 23, 1919. The Brunner device also utilizes a central cooking container which can have a cooking fluid contained therein, such as hot oil or the like, with a plurality of separate baskets then being extendible down into the fluid. The baskets are all constructed of a metallic mesh material so that if different foods are cooked in each basket, the flavors of the food will be intermixed by the cooking fluid.

While the cooking utensils discussed above are operational to perform their desired function, it can be appreciated that there are occasions when it might be desirable to cook different foods within the same cooking utensil without the problem of utilizing a hot cooking oil which effects the intermixing of the different food flavors. As such, there appears to exist a need for this type of cooking utensil, and in this respect, the present invention substantially fulfills this need.

SUMMARY OF THE INVENTION

In view of the foregoing disadvantages inherent in the known types of cooking utensils now present in the prior art, the present invention provides an improved cooking utensil wherein the same utilizes two or more fluid tight compartments with cooking oil being retained in each of the compartments, whereby different foods may be concurrently cooked without an intermixing of the cooking fluids. As such, the general purpose of the present invention, which will be described subsequently in greater detail, is to provide a new and improved cooking utensil which has all the advantages of the prior art cooking utensils and none of the disadvantages.

To attain this, the present invention essentially comprises a deep fat fryer having two or more fluid tight compartments contained therein. A quantity of cooking oil may be retained within each of the compartments, and independently operable heating coils for each compartment allow selective heating of the cooking oils. As such, different foods can be placed in each fluid tight compartment and cooked therein without the worry of flavor destruction and without the intermixing of a common supply of cooking oil.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved cooking utensil which has all the advantages of the prior art cooking utensils and none of the disadvantages.

It is another object of the present invention to provide a new and improved cooking utensil which may be easily and efficiently manufactured and marketed.

It is a further object of the present invention to provide a new and improved cooking utensil which is of a durable and reliable construction.

An even further object of the present invention is to provide a new and improved cooking utensil which is susceptible of a low cost of manufacture with regard to both materials and labor, and which accordingly is then susceptible of low prices of sale to the consuming public, thereby making such cooking utensils economically available to the buying public.

Still yet another object of the present invention is to provide a new and improved cooking utensil which provides in the apparatuses and methods of the prior art some of the advantages thereof, while simultaneously overcoming some of the disadvantages normally associated therewith.

Still another object of the present invention is to provide a new and improved cooking utensil which facilitates the concurrent cooking of different foods without an intermixing of flavors.

Yet another object of the present invention is to provide a new and improved cooking utensil which has independently operable cooking compartments contained therein.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a cooking utensil having three fluid tight compartments with such cooking utensil comprising a first embodiment of the present invention.

FIG. 2 is a side elevation view of the invention.

FIG. 3 is a top plan view of the invention.

FIG. 4 is a top plan view of a modified embodiment of the invention.

DESCRIPTION OF THE PREFERRED EMBODIMENTS

With reference now to the drawings, and in particular to FIGS. 1, 2 and 3 thereof, a new and improved cooking utensil embodying the principles and concepts of the present invention and generally designated by the reference numeral 10 will be described.

More specifically, it will be noted that the cooking utensil 10 essentially comprises a cylindrically shaped cooking pot 12 with such pot being of a conventional shape and design. However, the interior section of the pot 12 is divided into three substantially equal sized fluid tight compartments 14, 16, 18. In this respect, each of the compartments 14, 16, 18 are designed to hold a quantity of cooking oil to thus permit the deep frying of foods therein, while each of the compartments also utilize separate heating coils operable by respective on and off switches 20, 22, 24. As such, all or some of the compartments can be concurrently used to cook different foods without an intermixing of the cooking oils used therein, thereby to protect the flavor integrity of the food within each compartment.

FIG. 4 of the drawings illustrates a modified embodiment of the invention which is generally designated by the reference in numeral 30. In this respect, the cooking utensil 30 shown in FIG. 4 is provided with two separate, fluid tight compartments 32, 34 with each compartment having respective on and off switches 36, 38, thereby to permit the actuation of their independent and separate unillustrated heating coils. The embodiment of the invention shown in FIG. 4 is illustrative of the fact that a cooking utensil 10 or 30 could be provided with any number of fluid tight compartments. Accordingly, it is within the intent and purview of the present invention to include all types of cooking utensils which utilize fluid tight compartments that may be independently heated by separate sources of heat, and all such embodiments are intended to be encompassed by the claims appended hereto.

With respect to the manner of usage and operation of the present invention, the same should be apparent from the above description. Accordingly, no further discussion relative to the usage and operation of the invention will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principle of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A cooking utensil for deep frying foods, comprising:
   a. upstanding housing means, said housing means having a substantially cylindrical shape;
   b. a plurality of fluid tight compartment means retained within and integrally formed from said housing means, each of said fluid tight compartment means serving to hold a quantity of food to be cooked, each of said plurality of fluid tight compartment means retaining in independent supply of cooking oil;
   c. a plurality of switch means, each of said switch means controlling a supply of cooking heat to one of said plurality of fluid tight compartment means.

* * * * *